United States Patent
Hasegawa

(10) Patent No.: US 6,480,213 B2
(45) Date of Patent: Nov. 12, 2002

(54) PRINTING APPARATUS

(75) Inventor: Satoshi Hasegawa, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/934,873

(22) Filed: Aug. 22, 2001

(65) Prior Publication Data

US 2002/0024581 A1 Feb. 28, 2002

(30) Foreign Application Priority Data

Aug. 28, 2000 (JP) ........................................ 2000-257873

(51) Int. Cl.⁷ .............................................. G03G 15/00
(52) U.S. Cl. ........................ 347/131; 347/133; 358/300; 399/43
(58) Field of Search ................................. 347/129, 131, 347/132, 133, 246, 247; 358/1.2, 451, 296, 300; 399/43, 51, 196, 198

(56) References Cited

U.S. PATENT DOCUMENTS

| | | | | |
|---|---|---|---|---|
| 4,763,134 A | * | 8/1988 | Murahashi et al. | ......... 347/247 |
| 5,001,575 A | * | 3/1991 | Nakahara | .................... 358/1.9 |
| 5,160,967 A | * | 11/1992 | Tonegawa | .................... 399/51 |
| 5,194,879 A | * | 3/1993 | Kotabe et al. | ............... 358/300 |
| 5,420,617 A | | 5/1995 | Yoshino | |
| 5,428,425 A | * | 6/1995 | Miyamoto | .................... 399/52 |
| 5,950,039 A | * | 9/1999 | Kawai et al. | ................ 347/131 |

FOREIGN PATENT DOCUMENTS

| | | | |
|---|---|---|---|
| JP | 5-201062 A | | 8/1993 |
| JP | 2685799 B2 | | 8/1997 |

* cited by examiner

*Primary Examiner*—Joan Pendegrass
(74) *Attorney, Agent, or Firm*—Frishauf, Holtz, Goodman & Chick, P.C.

(57) ABSTRACT

The CPU counts the number of printings made with use of a photosensitive member so as to monitor the usage of the photosensitive member. When executing printing, the CPU determines a modulating rate, which is based on the reducing rate and some correction of the rate in accordance with the usage of the photosensitive member, with reference to a table. The CPU sets the determined modulating rate to the pulse modulating section. The pulse modulating section executes pulse modulation at the set modulating rate, and thus generates video data used for the printing operation of the print processing section.

7 Claims, 3 Drawing Sheets

PRINTING APPARATUS

CROSS-REFERENCE TO RELATED APPLICATIONS

This application is based upon and claims the benefit of priority from the prior Japanese Patent Application No. 2000-257873, filed Aug. 28, 2000, the entire contents of which are incorporated herein by reference.

BACKGROUND OF THE INVENTION

1. Field of the Invention

The present invention relates to a printing apparatus which can vary a printing density by changing the time for forming one dot.

2. Description of the Related Art

A printing apparatus such as an electrophotographic apparatus is able to vary the printing density by changing the time for forming one dot, that is, for example, the time for emitting a laser beam.

A printing apparatus of the above-described type is generally equipped with a function of size-reduction printing by thinning-out. When carrying out size-reduction printing, the time for forming one dot is shortened so as to decrease the printing density, and thus the creation of a blocked-up section in a thus-formed image is prevented.

However, even if the one-dot forming time is set constant, the printing density inevitably varies depending upon various conditions, including the thickness of the printing paper. Therefore, if the one-dot forming time is shortened uniformly while reduction printing, the printing density cannot be appropriately set, which may result in fainting of a thin line and blocking-up of an image.

BRIEF SUMMARY OF THE INVENTION

The object of the present invention is to become able to print a high-quality image at an appropriate printing density without fail if the image is printed at any magnifications.

The object can be achieved by the following printing apparatus.

That is, according to an aspect of the present invention, there is provided a printing apparatus comprising: a print processing section configured to executing printing on a printing paper by forming a great number of dots thereon, which can vary a printing density by changing a formation time for each dot; a changing section configured to change the dot formation time in the print processing section; a change control section configured to control the changing section so as to change the dot formation time in accordance with a printing magnification; a condition determining section configured to determine a predetermined condition which affects on the printing density; and a correcting section configured to further changing the dot formation time determined by the change control section on the basis of the condition determined by the condition determining section.

The above object can be achieved by the following method of controlling a printing apparatus.

That is, according to an aspect of the present invention, there is provided a method of controlling a printing apparatus, comprising: a print processing section configured to execute printing on a printing paper by forming a great number of dots thereon, which can vary a printing density by changing a formation time for each dot; and a changing section configured to change the dot formation time in the print processing section; the method comprising: a change control step configured to control the changing section so as to change the dot formation time in accordance with a printing magnification; a condition determining step configured to determine a predetermined condition which affects on the printing density; and a correcting step configured to further changing the dot formation time determined by the change control section on the basis of the condition determined by the condition determining section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will now be described with reference to accompanying drawings.

Figure 1:
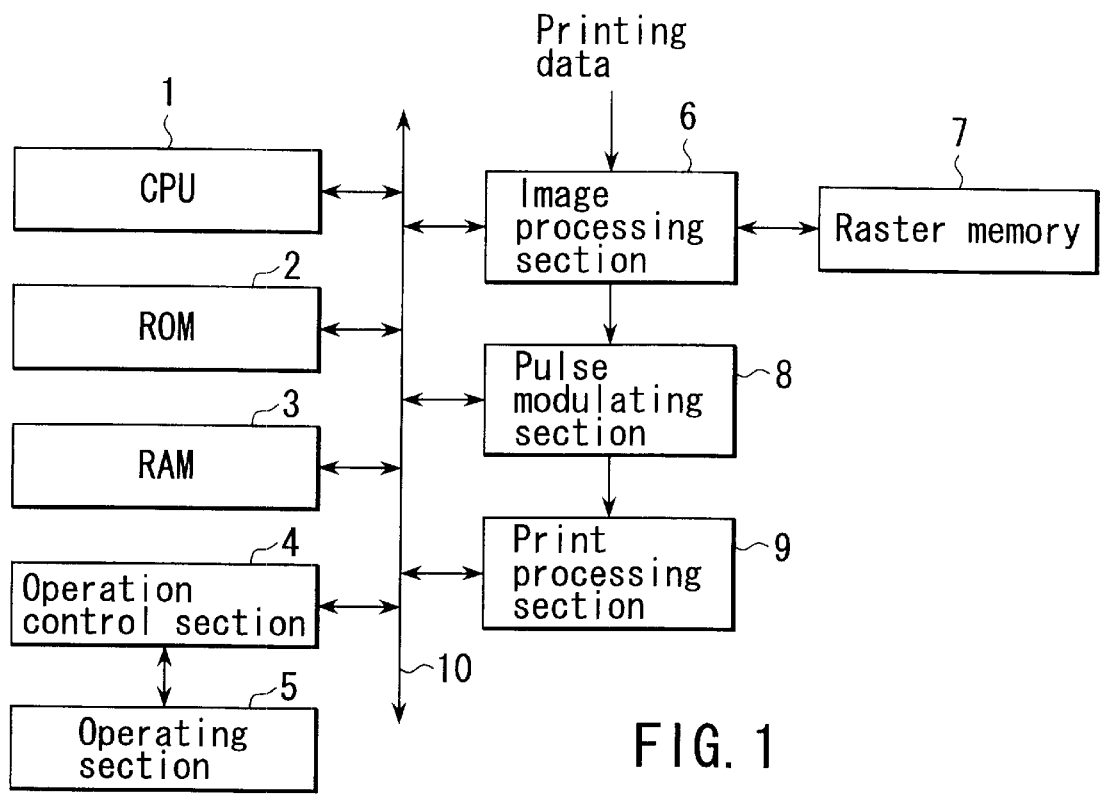
FIG. 1 is a block diagram showing a main structure of a printing apparatus according to an embodiment of the present invention.

FIG. 1 is a block diagram showing a main structure of a printing apparatus according to an embodiment of the present invention.

As shown in this figure, the printing apparatus of this embodiment includes a CPU 1, a ROM 2, a RAM 3, an operation control section 4, an operation section 5, an image processing section 6, a raster memory 7, a pulse modulation section 8 and a print processing section 9. The CPU 1, the ROM 2, the RAM 3, the operation control section 4, the image processing section 6, the pulse modulating section 8 and the print processing section 9 are connected to each other via a system bus 10.

The CPU 1 collectively controls sections of the printing apparatus in compliance with operation programs stored in the ROM 2, and thus the operations as a printing apparatus is realized.

The ROM 2 stores the operation program for the CPU 1 and other various data.

The RAM 3 temporarily stores various data necessary for the CPU 1 to execute various types of processing.

The operating section 5 is connected to the operation controlling section 4. The operation controlling section 4 is designed to accept an operation made by the user via the operating section 5, or to notify the user by driving the operating section 5.

The operating section includes an inputting device such as a key switch groups for accepting an operation made by the user, and a display device such as an LCD for notifying the user of information. The operating section 5 is used to transfer the contents of an operation made by the user to the operation controlling section 4, or to display for notification to the user under the control of the operation controlling section 4.

To the image processing section 6, printing data is given from, for example, a host computer, a scanner or a communication processing section (any of them not shown). The image processing section 6 converts printing data thus given, into raster data, and then temporarily stores the raster data in a raster memory 7. The image processing section 6 fetches the raster data from the raster memory 7 in accordance with an instruction from the CPU 1, and then the data is provided to the pulse modulating section 8. It should be noted here that when executing a reduction printing, the image processing section 6 generates raster data indicating a reduced image obtained by thinning out the raster data, that is, subtracting some data therefrom at a ratio in accordance with a reduction rate, and thus generated raster data is provided to the pulse modulating section 8.

The raster memory 7 is composed of, for example, a DRAM, and serves to temporarily store raster data.

The pulse modulating section 8 serves to modulate the pulse of raster data given from the image processing section 6 at a modulating rate instructed from the CPU 1. Then, the pulse modulating section 8 provides the pulse-modulated data thus obtained to the print processing section 9 as video data. In other words, the pulse modulating section 8 functions as a changing section.

The print processing section 9 executes an actual printing operation on printing paper in the electrophotographic mode.

Figure 2:
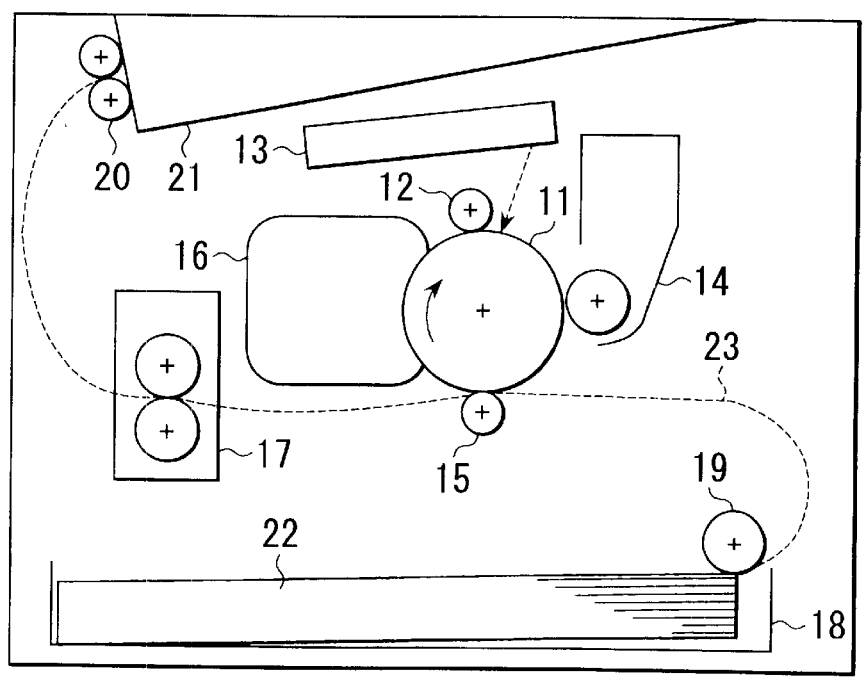
FIG. 2 is a schematic diagram showing a detailed structure of a print processing section in FIG. 1.

FIG. 2 is a schematic diagram showing a detail structure of the print processing section 9 shown in FIG. 1.

As shown in this figure, the print processing section 9 includes a photosensitive member 11, a charger unit 12, a laser scanner 13, a developing unit 14, a transfer unit 15, a cleaning unit 16, a fixing unit 17, a paper cassette 18, a paper-feeding roller 19, a paper-output roller 20 and an paper-output tray 21.

The photosensitive member 11 has a structure in which a photoconductive material is applied to form a photosensitive layer on an outer circumferential surface of a drum-shaped substrate made of a conductive member such as aluminum. The photosensitive member 11 is rotated at a constant speed in a direction indicated by an arrow by a rotation force of a motor, which is not shown.

Around the photosensitive member 11, the charger unit 12, the laser scanner 13, the developing unit 14, the transfer unit 15 and the cleaning unit 16 are arranged in this order along the outer circumference thereof.

The charger unit 12 serves to charge the surface of the photosensitive member 11 uniformly at a predetermined potential.

The laser scanner 13 serves to form an electrostatic latent image on the photosensitive surface of the photosensitive member 11 by carrying out an exposure onto the photosensitive surface of the photosensitive member 11 in accordance with printing data.

The developing unit 14 serves to develop the latent image formed on the surface of the photosensitive member 11, and thus forms a toner image on the surface of the member 11.

The transfer unit 15 serves to transfer a toner image formed on the photosensitive member 11 onto a printing paper 22 inserted between the photosensitive m ember 11 and the transfer unit 15.

The cleaning unit 16 serves to eliminate toner remaining on the surface of the photosensitive member 11 without being transferred onto the printing paper 22.

The fixing unit 17 is composed of, for example, a heat roller, and serves to fixing the toner image transferred onto the printing paper 22, by once fusing the toner.

The paper cassette 18 serves to store printing paper 22.

The paper-feeding roller 19 is rotated by the rotation force of the motor, which is not shown in the figure, so as to feed out the printing paper 22 stored in the paper cassette 18 sheet by sheet to a conveying pathway 23 made of, for example, a conveying guide, which is not shown in the figure. A sheet of the printing paper 22 which has been conveyed to the conveying pathway 23 is further conveyed to the paper-output roller 20 along the conveying pathway 23 by several conveying rollers, which are not shown in the figure.

The paper-output roller 20 is rotated by the rotation force of a motor, which is not shown in the figure, so as to output a sheet of the printing paper 22 on which the toner image has been fixed by the fixing unit 17, to the outside of the apparatus.

The paper-output tray 21 is designed to store printed sheets of the printing paper 22, which have been fed out by the paper-output roller 20.

The print processing section 9 having the above-described structure is able to change the size of a dot to be formed by changing the light emission time per one dot by the laser scanner 13. In other words, the density of an image to be printed can be varied by changing the light emission time per one dot.

The CPU 1, as it operates in compliance with the operation programs stored in the ROM 2, functions as a condition determining section and a modulation rate controlling section, in addition to the conventionally known general processing sections as a printing apparatus.

The condition determining section determines the usage of the photosensitive member 11 mounted on the print processing unit 9 when executing the printing operation. In this embodiment, the usage of the photosensitive member 11 is expressed in the number of printing.

The modulating rate controlling section determines the time for forming one dot on the basis of the usage of the photosensitive member 11, determined by the condition determining section, and the printing magnification, and further controls the modulating rate in the pulse modulating unit 8 on the basis of the determined one-dot formation time. In other words, the modulating rate controlling section includes functions as a change controlling section and a correcting section.

Next, the operation of the printing apparatus having the above-described structure will now be described.

Figure 3:
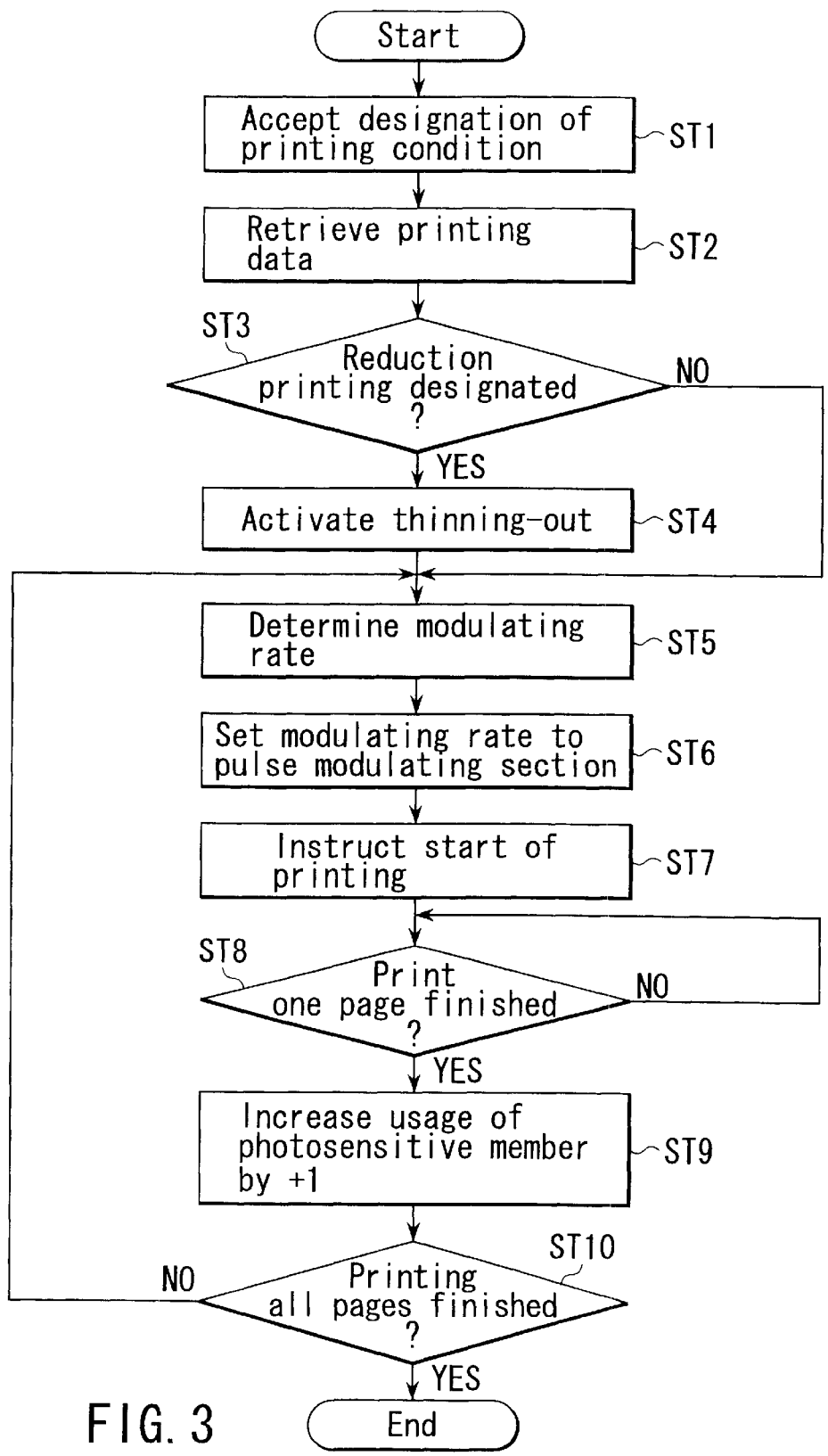
FIG. 3 is a flowchart illustrating a processing procedure controlled by the CPU in FIG. 1.

When the start of printing is requested, the CPU 1 starts a process as shown in FIG. 3.

That is, the CPU 1 first accepts an assignment of printing condition made by the user with, for example, the operating section 5 (Step ST1). Subsequently, the CPU 1 renders the image processing section 6 to fetch printing data (Step ST2).

When the fetching of printing data is finished, the CPU 1 confirms whether or not if the execution of the reduced printing is assigned as a printing condition (Step ST3). Then, only when it is confirmed that the execution of the reduced printing is assigned, the CPU 1 instructs the image processing section 6 to start a thinning process in accordance with the assigned reducing rate (step ST4).

Subsequently, the CPU 1 determines the modulating rate in the pulse modulating section 8 on the basis of the usage of the photosensitive member 11 at that point and the assigned reducing rate (step ST5). Here, the modulating rate is determined with reference to the data table shown in FIG. 4, which is registered in the ROM 2. The data table contains modulating rates together with reducing rates and usage of the photosensitive member 11, associated to the modulating rates. In this embodiment, the reducing rate is sectionalized into 5 steps, that is, "50% to 60%", "61% to 70%","71% to 80%","81% to 90%" and "91% to 100%". Also, the usage of the photosensitive member 11 is sectionalized into 5 steps, "0 sheet to 6000 sheets", "6001 sheets to 7000 sheets", "7001 sheets to 8000 sheets", "8001 sheets to 9000 sheets" and "9001 sheets to 10,000 sheets". The data table presents modulating rates which can be set to appropriately carry out printing of image under respective combinations of these sections indicated above. Note that these presented modulating rates were obtained by tests, simulations and the like.

In this embodiment, modulating rates presented in the data table are based on the initial state, that is here taken as the basis state, where the usage of the photosensitive member 11 is "0 sheets to 6000 sheets", and appropriate changes in the modulating rate which follow the reduction of size in printing are set to be "8/8", "7/8", "6/8", "5/8", "4/8". Further, as the usage of the photosensitive member 11 increases, these values are corrected in consideration of the decrease in the sensitivity of the photosensitive member 11 with respect to the basic values, and thus corrected values are set.

The CPU 1 sets the modulating rate determined as above, to the pulse modulating section 8 (Step ST6). Then, the CPU 1 instructs the image processing section 6, the pulse modulating section 8 and the print processing section 9 to start the printing (Step ST7).

When instructed to start the printing, the image processing section 6 retrieves the raster data stored in the raster memory 7, and provide the data to the pulse modulating section 8. At this point, the image processing section 6, only if the thinning process is activated, executes a thinning process at a rate in accordance with a designated reducing rate, and then the thinned raster data is provided to the pulse modulating section 8.

The pulse modulating section 8 modulates the pulse of the raster data given from the image processing section 6 at the modulating rate set by the CPU 1 as described above, and thus generates video data.

Figures 4, 5:
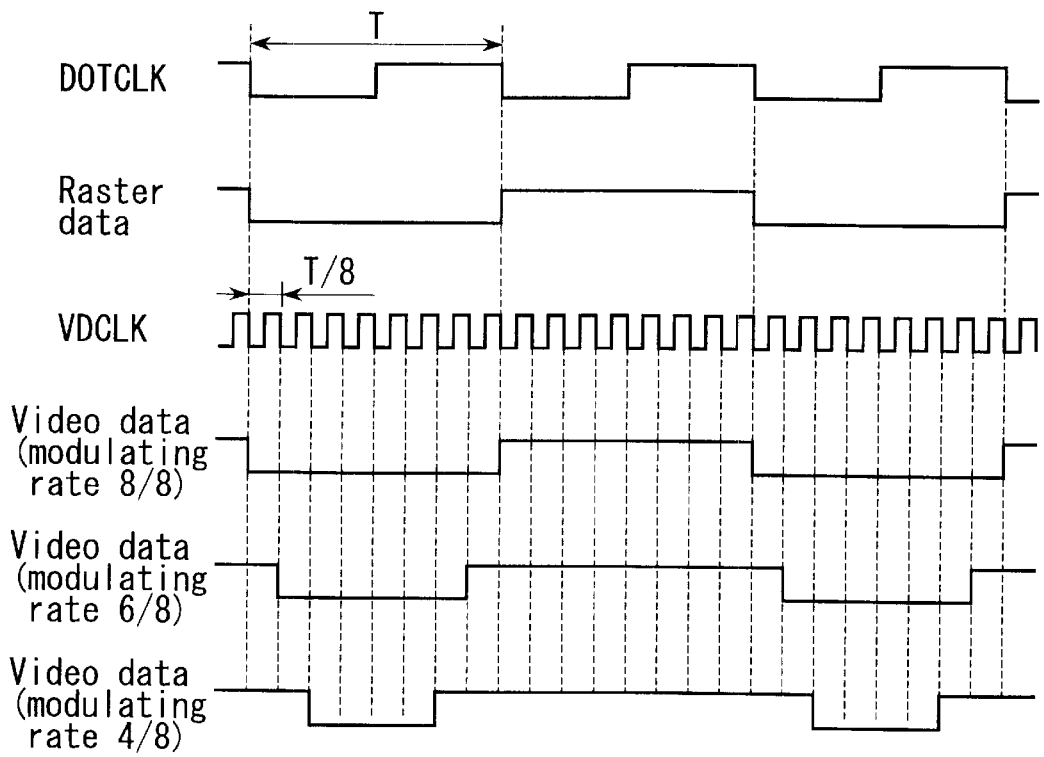
FIG. 4 is a diagram showing an example of a data table indicating modulation rates associated with a reducing rate and a usage of photosensitive member.
FIG. 5 is a timing chart illustrating a state of a pulse modulation in a pulse modulation unit in FIG. 1.

FIG. 5 is a diagram showing the state of the pulse modulation described above.

From the image processing section 6 to the pulse modulating section 8, the raster data is transferred in synchronism with DOTCLK having a period T appropriate to the resolution of the print processing section 9. To the pulse modulating section 8, not only the DOTCLK, but also a VDCLK which is faster than the DOTCLK (here, 8 times as high as the frequency of DOTCLK), is supplied. The pulse modulating section 8 executes pulse modulation on the basis of the VDCLK.

More specifically, when the modulating rate "8/8" is set, the pulse modulating section 8 sets the video data to a level indicating dot formation (that is, L level) for a period of 8 cycles of VDCLK within a period of 1 cycle of DOTCLK where the raster data is set to the level (L level) which indicates the dot formation. That is, the video data is set to L level over the entire one period of the DOTCLK where the raster level is set to L level.

When the modulating rate "6/8" is set, the pulse modulating section 8 sets the video data to L level over a period of 6 cycles of VDCLK, that is, from the second cycle to the seventh cycle, within a period of 1 cycle of DOTCLK where the raster data is set to the L level.

When the modulating rate "4/8" is set, the pulse modulating section 8 sets the video data to L level over a period of 4 cycles of VDCLK, that is, from the second cycle to the seventh cycle, within a duration of 1 period of DOTCLK where the raster data is set to the L level.

The print processing section 9 executes printing in the electrophotographic mode on the basis of the video data provided from the pulse modulating section 8 after the start of printing is instructed while operating the laser scanner 13 so as to carry out exposure only when the video data is set to the L level.

While the printing is being carried out, the CPU 1 stands by for the printing of one sheet to be finished (Step ST8). When the printing for that one sheet is finished, the CPU 1 increases the count of the usage of the photosensitive member 11 by +1 (Step ST9). Thus, the usage of the photosensitive member 11 is increased by +1 each time printing for one page is carried out, and thus it becomes possible to determine the optimal modulating rate in consideration of the degree of deterioration of the photosensitive member 11 in Step ST5. The usage of the photosensitive member 11 is reset to "0" when the photosensitive member 11 is replaced. Therefore, the usage of the photosensitive member 11 indicates the value of the count of the number of printings for the currently used photosensitive member 11.

After that, the CPU 1 confirms whether or not the printing for all of the currently requested pages is finished (Step ST10). When it is confirmed that some pages to be printed still remain, the CPU 1 repeats the processing steps from Step ST5 onwards, and executes the printing on these remaining pages. Then, when it is confirmed that the printing for all the pages is finished in Step ST10, the current process is finished.

As described above, in this embodiment, the usage of the photosensitive member 11 is monitored in terms of the number of printings carried out with use of the currently mounted photosensitive member 11. Then, the modulating rate determined on the basis of a reducing rate is corrected in accordance with the usage of the photosensitive member 11, and video data is obtained by pulse modulation at the obtained modulating rate. The printing is carried out with use of the video data. The photosensitive member 11 has such a property that, as it is used on, deteriorates and the sensitivity thereof decreases, and therefore the maintenance of the density becomes more difficult as the photosensitive member 11 is further used. However, as can be understood from FIG. 4, as the usage of the photosensitive member 11 increases, the modulating rate is prominently corrected, so as to set a longer time of exposure. As a result, in a reduction recording mode, not only the blocking-up of an image, which is caused by the reduction in size, but also the fainting of a thin line, which is caused by the deterioration in the sensitivity of the photosensitive member 11, can be appropriately prevented, thereby making it possible to form proper images at all times.

It should be noted that the present invention is not limited to the above-described embodiment. In the above embodiment, the degree of deterioration of the photosensitive member 11 is determined on the basis of the number of printings made by the presently mounted photosensitive member 11. However, it is alternatively possible that the degree of deterioration of the photosensitive member 11 may be determined some other parameter, for example, the amount of rotation (the total number of times of rotation, the total time of rotation, etc.) or a combination of such parameters.

Further, in the above embodiment, the degree of deterioration of the photosensitive member 11 is considered as a condition which has an effect on the printing density; however it is alternatively possible to consider some other condition, for example, the quality of the printing paper 22 (thickness, surface coarseness, whiteness, etc.), or a surrounding environment (humidity, temperature, etc.), or a combination of these. For example, when the condition is set to the thickness of the printing paper 22, the modulating rate should be corrected higher when printing paper 22 having a thickness larger than the standard thickness is used, or the rate should be corrected lower when printing paper 22 having a thickness smaller than the standard thickness, is used. It should be noted that these conditions may be set automatically with use of an appropriate sensor or the like, or set on the basis of the assignment by the user.

Further, the above embodiment presents an example where the electrophotographic mode is employed for printing; however the present invention can be applied some other mode as long as it can change the printing density by varying the one-dot formation time, such as the thermal transfer mode.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A printing apparatus comprising:
   a print processing section configured to executing printing on a printing paper by forming a great number of dots thereon, which can vary a printing density by changing a formation time for each dot;
   a changing section configured to change the dot formation time in the print processing section;
   a change control section configured to control the changing section so as to change the dot formation time in accordance with a printing magnification;
   a condition determining section configured to determine a predetermined condition which affects on the printing density; and
   a correcting section configured to further changing the dot formation time determined by the change control section on the basis of the condition determined by the condition determining section.

2. The printing apparatus according to claim 1, wherein the print processing section employs a photosensitive member, and
   the condition determining section determines a degree of deterioration of the photosensitive member as the predetermined condition.

3. The printing apparatus according to claim 2, wherein the condition determining section determines the degree of deterioration of the photosensitive member on the basis of a count of the number of printings made with use of the photosensitive member.

4. The printing apparatus according to claim 1, wherein the condition determining section determines a quality of the printing paper as the predetermined condition.

5. The printing apparatus according to claim 1, wherein the print processing section executes printing by an electrophotographic process.

6. The printing apparatus according to claim 1, wherein the changing section changes the formation time by modulating a pulse width of a pulse signal which notifies formation/not-formation of a dot to the print processing section.

7. A method of controlling a printing apparatus, comprising: a print processing section configured to execute printing on a printing paper by forming a great number of dots thereon, which can vary a printing density by changing a formation time for each dot; and a changing section configured to change the dot formation time in the print processing section;

said method comprising:
   controlling the changing section so as to change the dot formation time in accordance with a printing magnification;
   determining a predetermined condition which affects on the printing density; and
   further changing the changed dot formation time on the basis of the determined condition.

* * * * *